G. L. HANKE.
CULTIVATOR BEAM ADJUSTER.
APPLICATION FILED OCT. 25, 1915.
1,187,310.
Patented June 13, 1916.
2 SHEETS—SHEET 1.
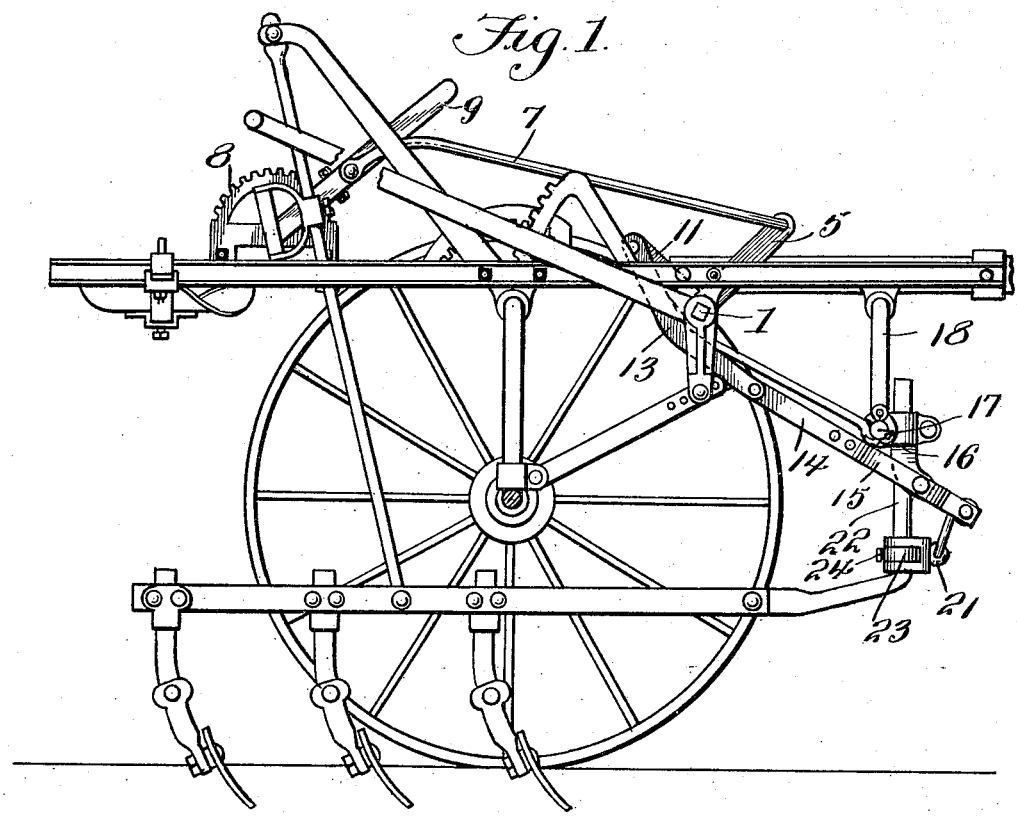
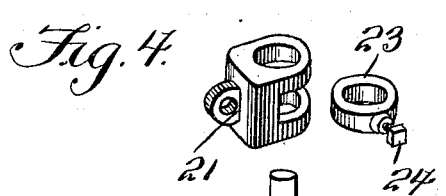
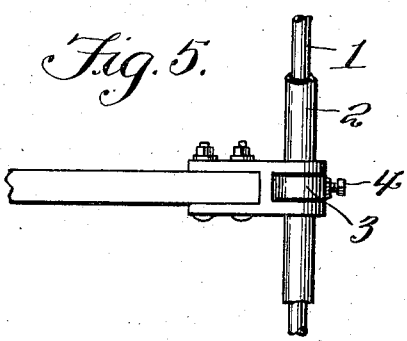
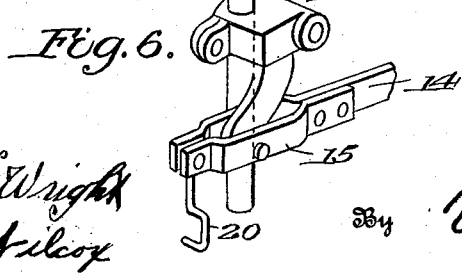
Inventor
George L. Hanke
By Victor J. Evans
Attorney
Witnesses

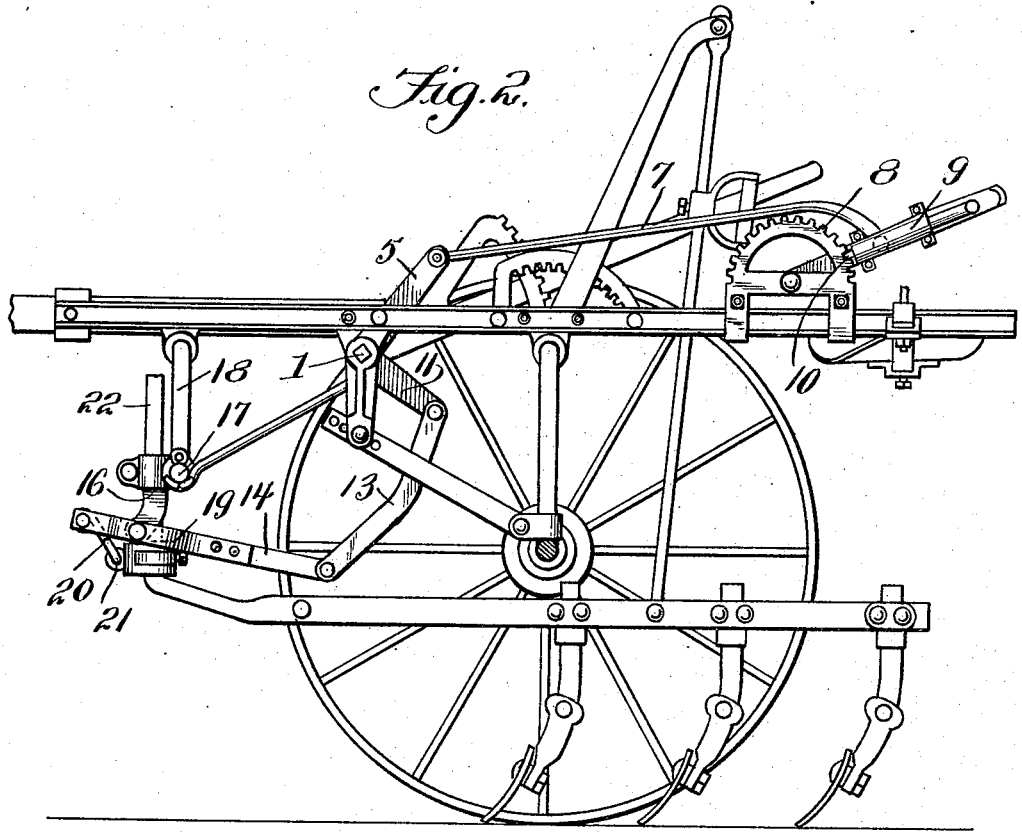
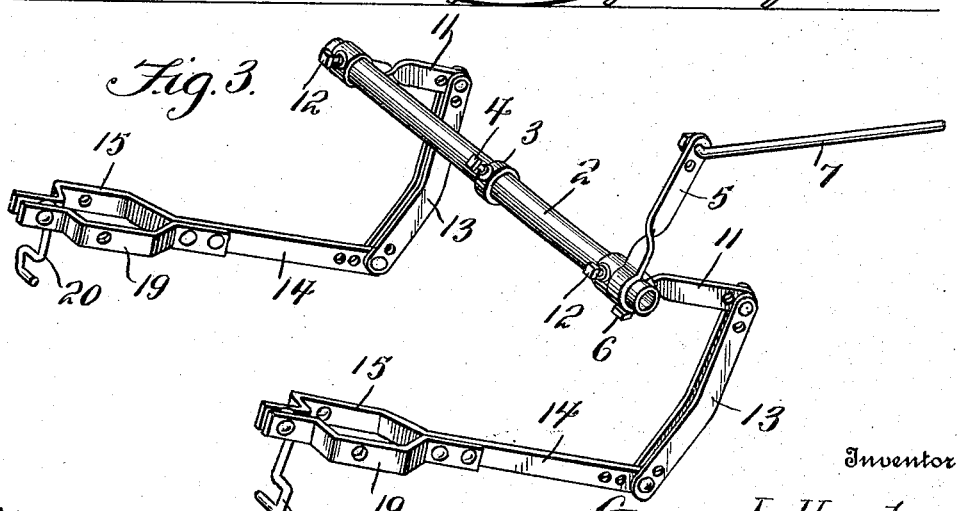

UNITED STATES PATENT OFFICE.

GEORGE L. HANKE, OF CROSS PLAINS, TEXAS.

CULTIVATOR-BEAM ADJUSTER.

1,187,310.

Specification of Letters Patent.

Patented June 13, 1916.

Application filed October 25, 1915. Serial No. 57,861.

*To all whom it may concern:*

Be it known that I, GEORGE L. HANKE, a citizen of the United States, residing at Cross Plains, in the county of Callahan and State of Texas, have invented new and useful Improvements in Cultivator-Beam Adjusters, of which the following is a specification.

This invention relates to a beam adjustment for cultivators and consists of the novel features hereinafter described and claimed.

One object of the invention is to provide an attachment of simple and durable structure adapted to be applied to a cultivator frame and connected with the beams thereof and which may be easily and quickly manipulated for raising or lowering the forward ends of the beams.

With this object in view the attachment includes a pipe which is journaled upon the shaft of the cultivator there being means provided for turning the crank on the same. Arms are adjustably fixed upon the pipe and links are pivotally connected at one end with the said arms and pivotally connected at their other ends with levers. The levers are fulcrumed upon fittings mounted upon the spindle ends of an arch bar carried by the cultivator frame and hooks are pivotally connected with the forward ends of the said levers and are adapted to engage eyes attached to the forward ends of the cultivator beams.

In the accompanying drawings:—Figure 1 is a view of a cultivator showing the adjustment applied. Fig. 2 is a similar view looking at the cultivator at the opposite side from that shown in Fig. 1. Fig. 3 is a perspective view of the beam adjuster. Fig. 4 is a perspective view of an eye and a collar used in the beam adjuster. Fig. 5 is a top plan view showing the manner in which the tongue of the cultivator may be connected with the beam adjuster. Fig. 6 is a perspective view of parts of the device.

As illustrated in the accompanying drawings the cultivator to which the attachment is applied may be of any conventional type the said cultivator being provided upon its frame with a shaft 1. A pipe 2 is journaled upon the said shaft and a collar 3 is adjustably mounted upon the intermediate portion of the said pipe and may be held at an adjusted position by means of a set screw 4. The collar 3 may be connected with the tongue of the cultivator in any suitable manner as shown in Fig. 5. An arm 5 is held at a fixed position upon the pipe 2 by means of a set screw 6 and a rod 7 is pivotally connected with the upper end of the said arm 5.

A toothed segment 8 is mounted upon the frame of the cultivator and a lever 9 is fulcrumed at the side of the said segment. The rear end of the rod 7 is pivotally connected with the lever 9 at a point above the segment 8. The lever 9 is provided with a spring pressed pawl 10 adapted to engage the teeth of the segment 8 whereby the said lever is held at an adjusted position with relation to the segment.

The arms 11 are adjustably secured to the pipe 2 by means of set screws 12 and links 13 are pivotally connected at their upper ends to the rear ends of the arms 11. The said links 13 have angularly disposed end portions in order that they may properly pass around parts depending from the upper portion of the cultivator frame. The links 13 are pivotally connected at their lower ends with the rear ends of levers 14. The said levers are provided in the vicinity of their forward ends with offset portions 15 which are pivotally connected with guides 16 mounted upon the spindle ends 17 of an arch bar 18 carried at the forward portion of the cultivator frame. Bracing strips 19 are connected with the forward ends of the levers 14 and lie at the opposite sides of the said guides 16 from the offset portions 15 of said levers and are also pivoted to the said guides. Hooks 20 are pivoted at their upper ends to the ends of the levers 14 and the adjacent strips 19 and engage in eyes 21 which are adjustably fitted at the forward end portions of the cultivator beams 22. Collars 23 are adjustably mounted upon the forward portions of the cultivator beams 22 and lie between the opposite ends of the eye members 21 and are held in adjusted position upon the said beams by means of set screws 24. The forward end portions of the beams 22 are upwardly disposed and loosely mounted in the guide 16. Therefore it will be seen that by swinging the lever 9 the rod 7 is moved longitudinally whereby the arm 5 is swung and the pipe 2 is turned upon the shaft 1. As the pipe 2 turns the arms 11 are swung whereby the links 13 are moved longitudinally and the levers 14 are swung upon their fulcrum connection with the guides 16. Hooks 20 are moved longitudinally and through the connecting eye members 21 the forward ends of the beams 22 are raised or lowered. Therefore it will be seen that a simple means is provided for adjusting the beams 22 to desired angles with relation to a horizontal and therefore the soil engaging members which are carried by the beams may be presented at a desired angle to the soil and the said soil engaging members may operate at a desired distance to lower the surface of the soil irrespective of the depth of the furrow along which the cultivator is moving.

Having described the invention what is claimed is:—

1. In combination with a cultivator having a guide mounted thereon and a cultivator beam slidably mounted in the guide, an adjustment for the beam comprising a member turnably mounted on the frame of the cultivator and means for turning said member, an arm adjustably fixed to the member, a link pivotally connected with the arm, a lever fulcrumed upon the guide and pivotally connected with the said link, and means operatively connecting the working end of the lever with the cultivator beam.

2. In combination with a cultivator having a guide and a beam slidably mounted in the guide, means for adjusting the beam comprising a hollow member turnably mounted upon a turnable part of the cultivator, means for turning said member, an arm adjustably fixed to the member, a link pivotally connected with the arm, a lever fulcrumed upon the guide and pivotally connected with said link, and means operatively connecting the working end of the lever with the cultivator beam.

In testimony whereof I affix my signature in presence of two witnesses.

GEORGE L. HANKE.

Witnesses:
R. L. McANALLY,
G. G. KOENIG.

Copies of this patent may be obtained for five cents each, by addressing the "Commissioner of Patents, Washington, D. C."